(12) United States Patent
Hu et al.

(10) Patent No.: US 8,320,139 B2
(45) Date of Patent: Nov. 27, 2012

(54) SWITCHING REGULATOR WITH FREQUENCY LIMITATION AND METHOD THEREOF

(75) Inventors: Jin Hu, Hangzhou (CN); James C. Moyer, San Jose, CA (US); Junming Zhang, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 357 days.

(21) Appl. No.: 12/761,748

(22) Filed: Apr. 16, 2010

(65) Prior Publication Data

US 2010/0265742 A1    Oct. 21, 2010

(30) Foreign Application Priority Data

Apr. 17, 2009  (CN) .......................... 2009 1 0058988

(51) Int. Cl.
*H02M 3/335* (2006.01)

(52) U.S. Cl. ................................. 363/21.13; 363/21.15
(58) Field of Classification Search ............... 363/21.13, 363/21.15, 21.16, 131
See application file for complete search history.

(56) References Cited

U.S. PATENT DOCUMENTS 5,771,165 A * 6/1998 Couture et al. ................. 363/97
7,586,767 B1 * 9/2009 Prodic et al. .................... 363/65

* cited by examiner

*Primary Examiner* — Shawn Riley
(74) *Attorney, Agent, or Firm* — Perkins Coie LLP

(57) ABSTRACT

A switching regulator with frequency limitation comprises a switch, a current sensing circuit, a voltage feedback circuit, a control circuit and a frequency limitation circuit. The current sensing circuit senses the current flowing through the switch and generating a current sensing signal representative of it. The voltage feedback circuit senses the output signal of the switching regulator and generates a feedback signal accordingly. The control circuit compares the current sensing signal with the feedback signal and turns off the switch based on the comparison result. The frequency limitation circuit is electrically coupled to the control circuit to limit the switching frequency of the switch.

16 Claims, 8 Drawing Sheets

US 8,320,139 B2

SWITCHING REGULATOR WITH FREQUENCY LIMITATION AND METHOD THEREOF

CROSS-REFERENCE TO RELATED APPLICATIONS

This application claims priority to and the benefit of Chinese Patent Application No. 200910058988.6 filed on Apr. 17, 2009, which is incorporated herein by reference in its entirety.

TECHNICAL FIELD

The present invention generally relates to a switching regulator.

BACKGROUND

A DC voltage is used as the power supply in many electronic devices. Generally, the DC voltage is derived from an AC power source. The AC voltage is rectified into an unregulated DC voltage by a rectifier bridge. The unregulated DC voltage is converted into the DC voltage as needed by a switching power supply.

A transformer or inductor is usually used as a tank element in the switching power supply. For example, a transformer is used in the flyback converter. A switch is electrically coupled to the primary winding of the transformer. The switch is turned on and off so as to alternately store energy in the transformer and transfer the stored energy to the secondary winding of the transformer. An output capacitor is electrically coupled to the secondary winding of the transformer and a rectified voltage is generated thereon. The rectified voltage provides the DC output voltage of the switching power supply. The DC output voltage increases and decreases inversely with the load. The heavier the load, which means the higher the output current, the lower the output voltage, and vice versa. Generally, the DC output voltage is fed back to control compensation for the variation of the load.

Under CCM (continuous current mode, which means the current flowing through the tank element is continuous), the output power of the switching power supply is $$P_{out\_CCM} = \frac{1}{2} L(I_{peak}^2 - I_{valley}^2) f \eta,$$

while under DCM (discontinuous current mode, which means the current flowing through the tank element is discontinuous), the output power is $$P_{out\_DCM} = \frac{1}{2} L I_{peak}^2 f \eta,$$

wherein L is the inductance of the tank element, $I_{peak}$ is the peak value of the current flowing through the tank element, $I_{valley}$ is the valley value of the current flowing through the tank element, f is the switching frequency and $\eta$ is the efficiency of the switching power supply.

Generally, the switching frequency of the switching power supply is very high, such as tens of kilohertz, to get high efficiency and small volume. The high-frequency switching will cause a serious EMI (electromagnetic interference) problem, which may not only reduce the quality of the power network, but also influence the electrical devices connected to or close by the switching power supply. EMI standards, such as EN55022, are established as a result. The EMI limit in these standards is often lower during high frequency, and higher during low frequency. So, it is difficult for a switching power supply with ultra-high switching frequency to pass the EMI standards. Furthermore, the higher the switching frequency, the larger the power loss.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

An AC/DC converter is used as an example thereafter. However, it will be obvious to one of ordinary skill in the art that the present invention can be applied to any DC/DC topologies, such as buck, boost, buck-boost, flyback, forward and so on.

Figure 1:
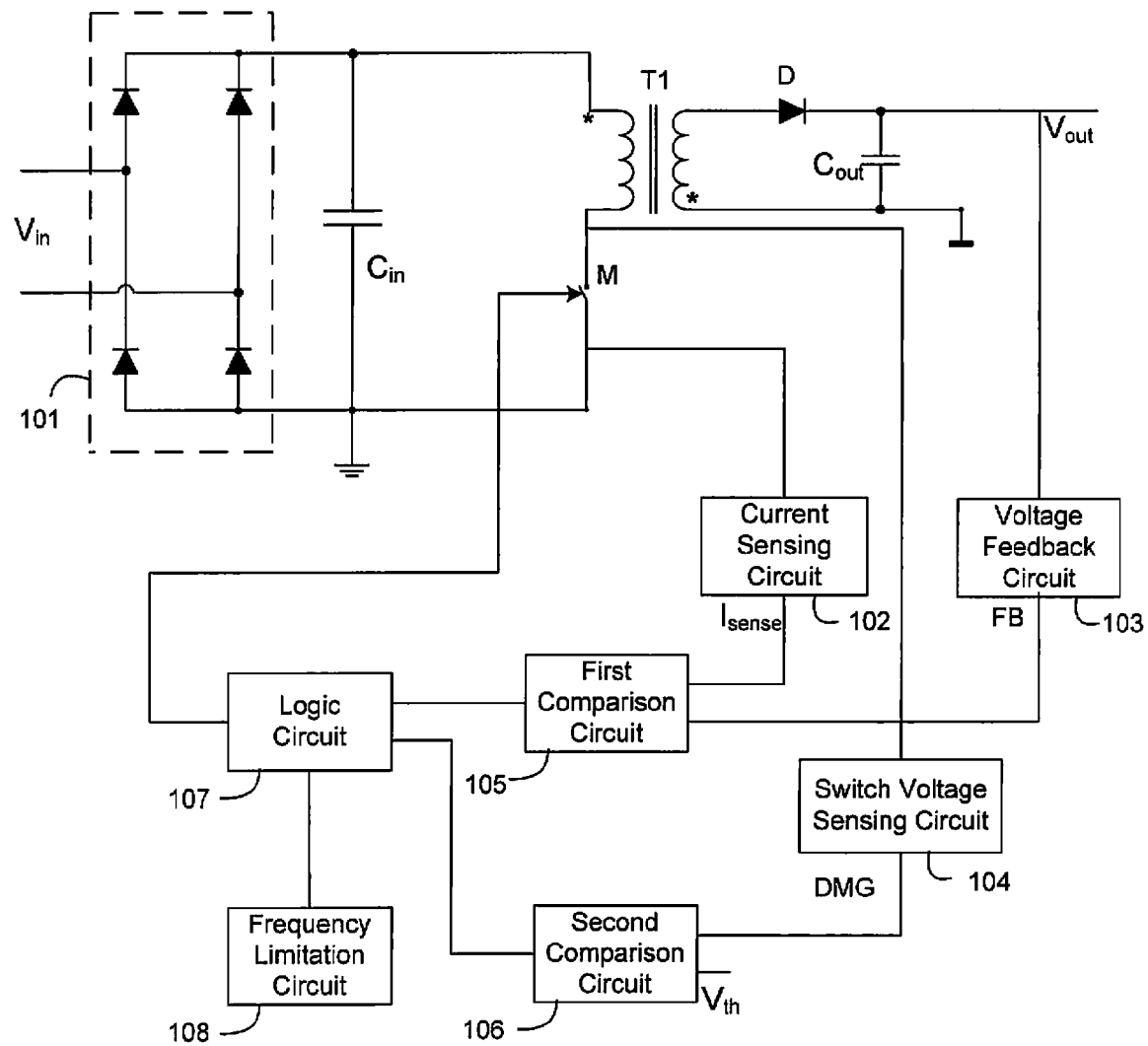
FIG. 1 is the block diagram of a switching regulator with frequency limitation, in accordance with one embodiment of the present disclosure.

FIG. 1 is the block diagram of a switching regulator with frequency limitation, in accordance with one embodiment of the present disclosure. It comprises a rectifier bridge 101, an input capacitor $C_{in}$, a transformer T1, a switch M, a diode D, an output capacitor $C_{out}$, a current sensing circuit 102, a voltage feedback circuit 103, a switch voltage sensing circuit 104, a first comparison circuit 105, a second comparison circuit 106, a logic circuit 107 and a frequency limitation circuit 108. The switching regulator utilizes a quasi-resonant control method and works under DCM. The transformer T1 stores energy when the switch M is on. The stored energy is transferred to the load when the switch M is off. After all the stored energy is transferred to the load, the leakage inductance of the transformer T1 becomes resonant with the parasitic capacitance of the switch M. The switch M is turned on when the voltage across the switch M reaches its resonant valley, so as to reduce the power loss and enhance the efficiency.

The rectifier bridge 101 receives an AC input voltage $V_{in}$ and converts it into an uncontrolled DC voltage. The input capacitor $C_{in}$ is electrically connected between the output terminals of the rectifier bridge 101. One terminal of the input capacitor $C_{in}$ is electrically connected to one terminal of the primary winding of the transformer T1. The other terminal of the input capacitor $C_{in}$ is grounded. The switch M is electrically coupled between the other terminal of the primary winding or the transformer T1 and the ground. The switch M may be any controllable semiconductor device, such as MOSFET (metal oxide semiconductor field effect transistor), IGBT (isolated gate bipolar transistor) and or the like. The anode of the diode D is electrically connected to one terminal of the secondary winding of the transformer T1, while the cathode is electrically connected to one terminal of the output capacitor $C_{out}$. The other terminal of the output capacitor $C_{out}$ is electrically connected to the other terminal of the secondary winding of the transformer T1. The voltage across the output capacitor $C_{out}$ is the output voltage $V_{out}$ of the switching regulator. In one embodiment, the diode D is replaced by a synchronous switch.

The current sensing circuit 102 is electrically coupled to the switch M to sense the current flowing through the switch M and generate a current sensing signal $I_{sense}$ representative of it. The current sensing circuit 102 may be realized by a resistor, transformer, current amplifier or the like. The voltage feedback circuit 103 is electrically coupled to the output terminals of the switching regulator to sense the output voltage $V_{out}$ and generate a feedback signal FB accordingly. The voltage feedback circuit 103 may comprise a photocoupler or transformer. In one embodiment, the transformer T1 further comprises an auxiliary winding. The voltage feedback circuit 103 is electrically coupled to the auxiliary winding to sense the voltage across it. The voltage across the auxiliary winding can represent the output voltage $V_{out}$. The auxiliary winding may be placed on the primary side, or the secondary side of the transformer T1. The switch voltage sensing circuit 104 is electrically coupled to the switch M to sense the voltage $V_{ds}$ across the switch M and generate a switch voltage sensing signal DMG accordingly. In one embodiment, the transformer T1 further comprises an auxiliary winding. The switch voltage sensing circuit 104 is electrically coupled to the auxiliary winding to sense the voltage across it and generate the switch voltage sensing signal DMG accordingly. The auxiliary winding may be placed on the primary side, or the secondary side of the transformer T1.

The first comparison circuit 105 is electrically coupled to the current sensing circuit 102 and the voltage feedback circuit 103 to compare the current sensing signal $I_{sense}$ with the feedback signal FB. The second comparison circuit 106 is electrically coupled to the switch voltage sensing circuit 104 to compare the switch voltage sensing signal DMG with a threshold $V_{th}$. The logic circuit 107 is electrically coupled to the first comparison circuit 105, the second comparison circuit 106 and the switch M to control the on and off of the switch M based on the comparison results. The switch M is turned off when the current sensing signal $I_{sense}$ is larger than the feedback signal FB, and turned on when the switch voltage sensing signal DMG is smaller then the threshold $V_{th}$. The frequency limitation circuit 108 is electrically coupled to the logic circuit 107 to limit the switching frequency of the switch M. The switching frequency is limited through setting a minimum off time $t_{limit}$. The switch is locked and cannot be turned on during the minimum off time $t_{limit}$ after the switch M being turned off. In one embodiment, the minimum off time $t_{limit}$ is constant. In another embodiment, the minimum off time $t_{limit}$ is variable with the load.

In one embodiment, the frequency limitation circuit 108 comprises a gate circuit and a signal generator. The gate circuit is electrically coupled between the logic circuit 107 and the first comparison circuit 105 or the second comparison circuit 106. A frequency limitation signal FL is generated by the signal generator according to the output signal of the logic circuit 107. The frequency limitation signal FL maintains valid (low level "0", or high level "1") for $t_{limit}$ after the switch M being turned off. At any other time, the frequency limitation signal FL is invalid (high level "1", or low level "0"). When the frequency limitation signal FL is valid, the switch M is maintained off so as to limit its switching frequency.

Figure 2:
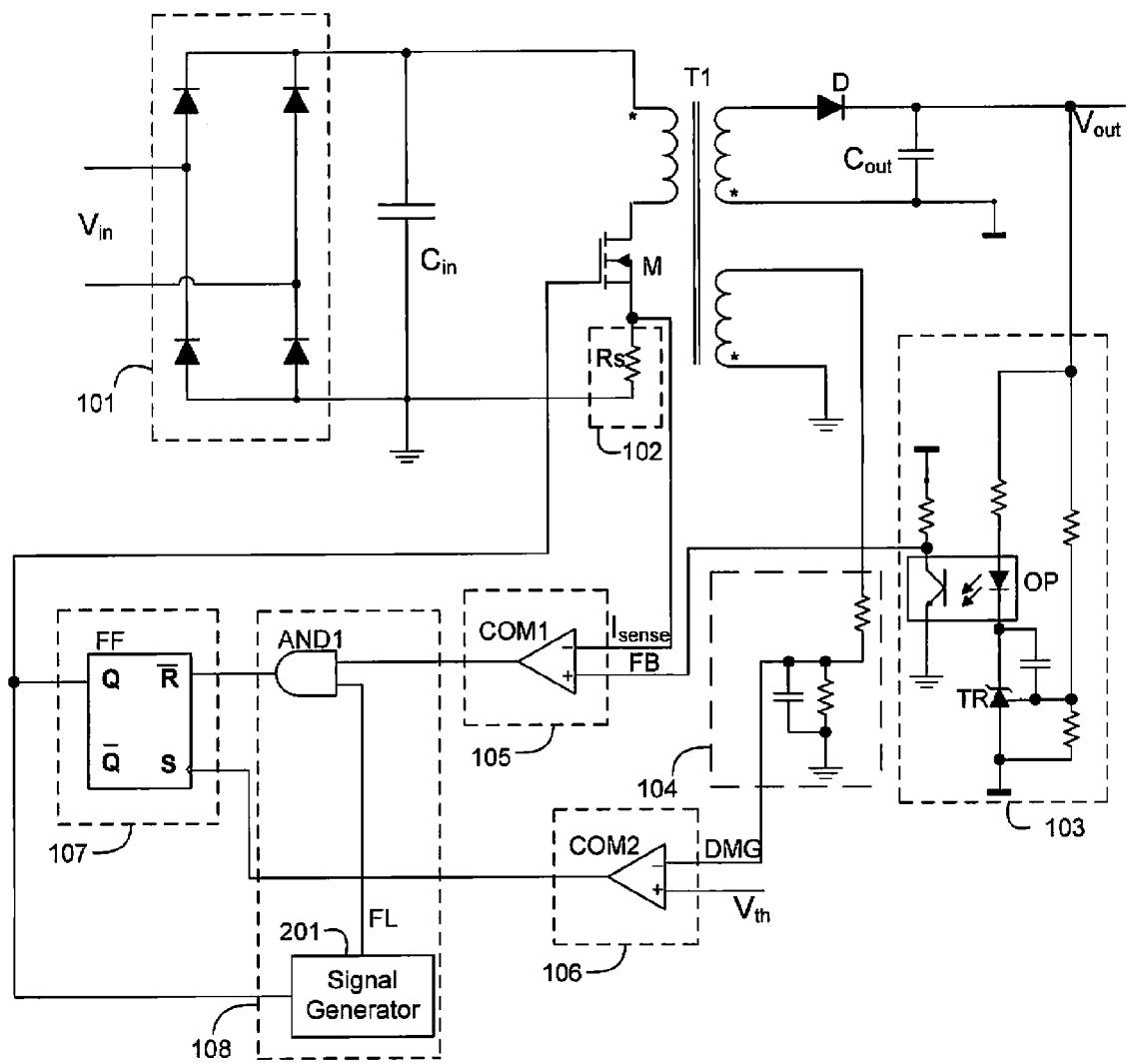
FIG. 2 illustrates a switching regulator with frequency limitation, in accordance with one embodiment of the present disclosure.

FIG. 2 illustrates a switching regulator with frequency limitation, in accordance with one embodiment of the present disclosure. The switch M is a NMOS (n-type MOSFET). The current sensing circuit 102 comprises a sensing resistor $R_s$ connected between the source of the switch M and the ground. The voltage feedback circuit 103 comprises a photocoupler OP and a three terminal shunt regulator TR. The feedback signal FB is increased and decreased inversely with the output voltage $V_{out}$. The transformer T1 comprises an auxiliary winding. The switch voltage sensing circuit 104 is electrically connected to the auxiliary winding to sense the voltage across it and generate the switch voltage sensing signal DMG accordingly.

The first comparison circuit 105 comprises a comparator COM1. The non-inverting input terminal of the comparator COM1 is electrically connected to the voltage feedback circuit 103 to receive the feedback signal FB, while the inverting input terminal is electrically connected to the current sensing circuit 102 to receive the current sensing signal $I_{sense}$. The second comparison circuit 106 comprises a comparator COM2. The non-inverting input terminal of the comparator COM2 receives the threshold $V_{th}$, while the inverting input terminal is electrically connected to the switch voltage sensing circuit 104 to receive the switch voltage sensing signal DMG. The logic circuit 107 comprises a flip-flop FF which comprises a set terminal receiving a set signal and a reset terminal receiving a reset signal. The frequency limitation circuit 108 comprises a signal generator 201 and an AND circuit AND1. The signal generator 201 is electrically connected to the output terminal of the flip-flop FF to receive output signal Q of the flip-flop FF and generate the frequency limitation signal FL accordingly. The frequency limitation signal FL maintains valid (low level, "0") for $t_{limit}$ after the switch M being turned off by the flip-flop FF. One input terminal of the AND circuit AND1 is electrically connected to the output terminal of the comparator COM1, while the other input terminal is electrically connected to the signal generator 201 to receive the frequency limitation signal FL. The reset terminal of the flip-flop FF is electrically connected to the output terminal of the AND circuit AND1. The set terminal is electrically connected to the output terminal of the comparator COM2. The flip-flop FF is reset dominate. It is reset when the reset signal is low level ("0"), and is set at the rising edge of the set signal. When the frequency limitation signal FL is valid, the output signal of the AND circuit AND1 is low. Since the flip-flop FF is reset dominate, its output is also low regardless of the set signal. The switch M maintains off and the switching frequency is limited.

Figure 3:
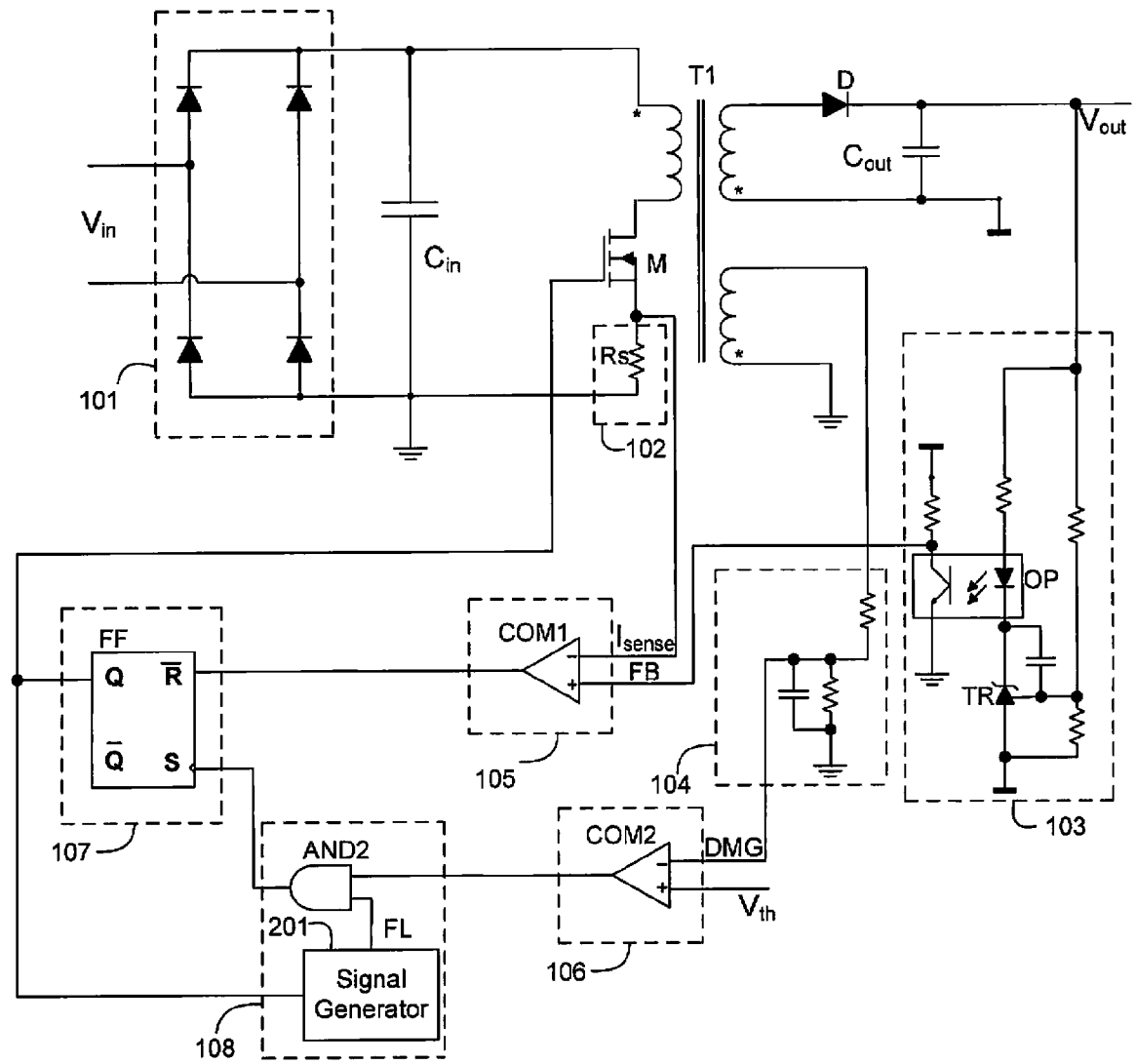
FIG. 3 illustrates a switching regulator with frequency limitation, in accordance with another embodiment of the present disclosure.

FIG. 3 illustrates a switching regulator with frequency limitation, in accordance with another embodiment of the present disclosure. The configuration of the switching regulator is similar to the one shown in FIG. 2. The frequency limitation circuit 108 comprises the signal generator 201 and an AND circuit AND2. One input terminal of the AND circuit AND2 is electrically connected to the output terminal of the comparator COM2, while the other input terminal is electrically connected to the signal generator 201 to receive the frequency limitation signal FL. The reset terminal of the flip-flop FF is electrically connected to the output terminal of the comparator COM1, while the set terminal is electrically connected to the output terminal of the AND circuit AND2. The signal generator 201 is electrically connected to the output terminal of the flip-flop FF to receive the output signal Q of the flip-flop FF and generate the frequency limitation signal FL accordingly. The frequency limitation signal FL maintains valid (low level, "0") for $t_{limit}$ after the switch M being turned off by the flip-flop FF. When the frequency limitation signal FL is valid, the output signal of the AND circuit AND2 is low. The output of the flip-flop FF maintains low and the switch M maintains off. So the switching frequency is limited.

Figure 4:
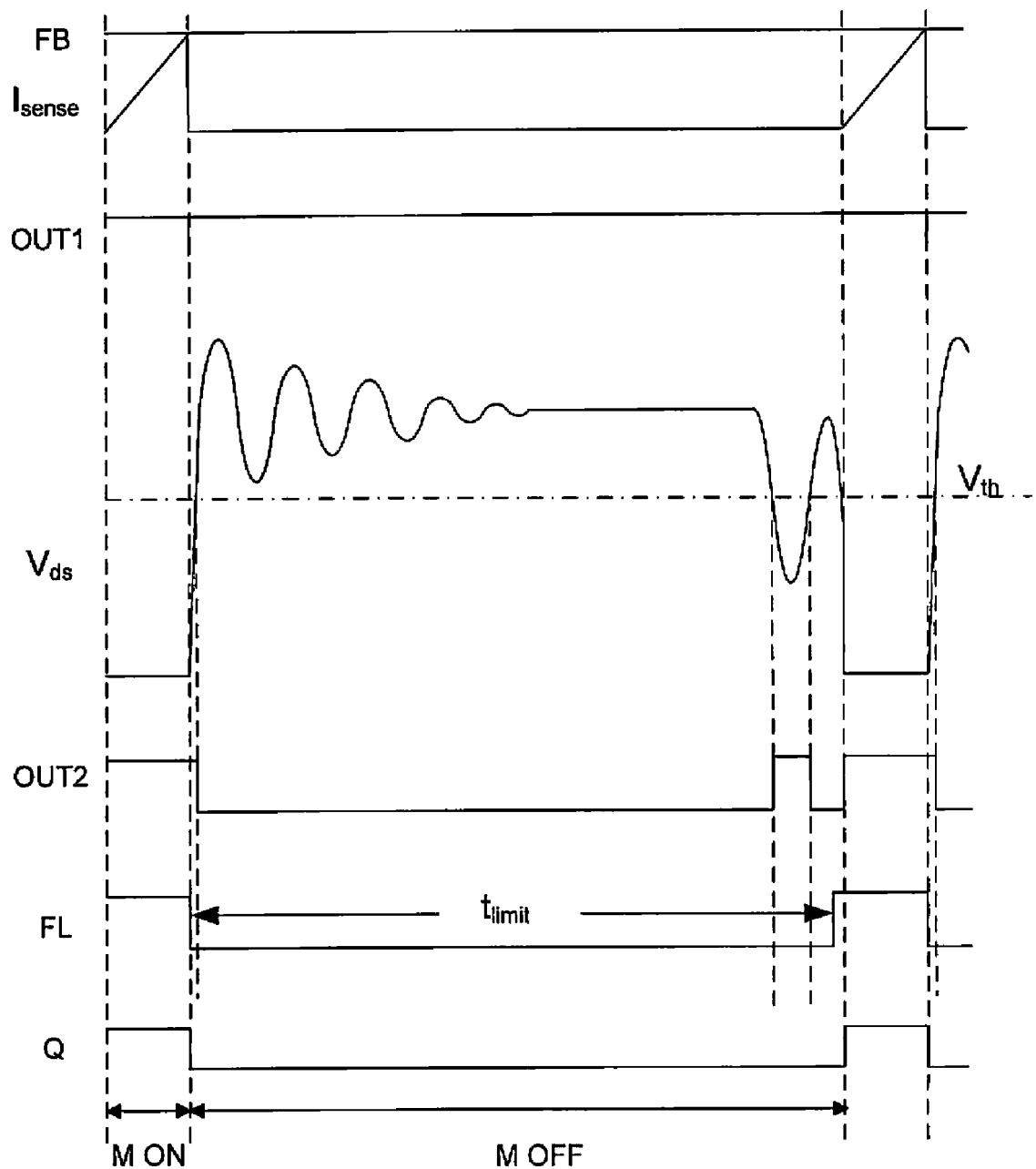
FIG. 4 is the waveform of the switching regulators shown in FIG. 2 and FIG. 3.

FIG. 4 is the waveform of the switching regulators shown in FIG. 2 and FIG. 3, wherein OUT1 is the output signal of the comparator COM1 and OUT2 is the output signal of the comparator COM2. When the current sensing signal $I_{sense}$ is larger than the feedback signal FB, the output signal Q of the flip-flop FF as well as the output signal OUT1 of the comparator COM1 becomes low. The switch M is turned off and the frequency limitation signal FL becomes valid (low level). The frequency limitation signal FL becomes invalid (high level) after $t_{limit}$. When the frequency limitation signal FL is valid, the comparison result OUT2 between the switch voltage sensing signal DMG and the threshold $V_{th}$ is shielded. The output signal Q of the flip-flop FF maintains low and the switch M is off. When the frequency limitation signal is invalid, the switch M is turned on once the voltage sensing signal DMG becomes smaller than the threshold $V_{th}$. As a result, the off time of the switch M is limited to be larger than or equal to the minimum off time $t_{limit}$.

The switching cycle of the switch M is composed of the on time and the off time. The on time of the switch M is determined by the feedback signal FB which determines the peak current $I_{peak}$, the primary excitation inductance of the transformer T1 and the input voltage $V_{in}$. The off time of the switch M is determined by the feedback signal FB and the resonance time. The output power under DCM is $$P_{out\_DCM} = \frac{1}{2} L I_{peak}^2 f \eta.$$

When the input voltage $V_{in}$ maintains constant, the on time and the off time of the switch M are both increased under light load through setting the minimum off time $t_{limit}$. So the switching frequency is limited. The efficiency and the EMI distribution of the switching regulator are both improved.

Figure 5:
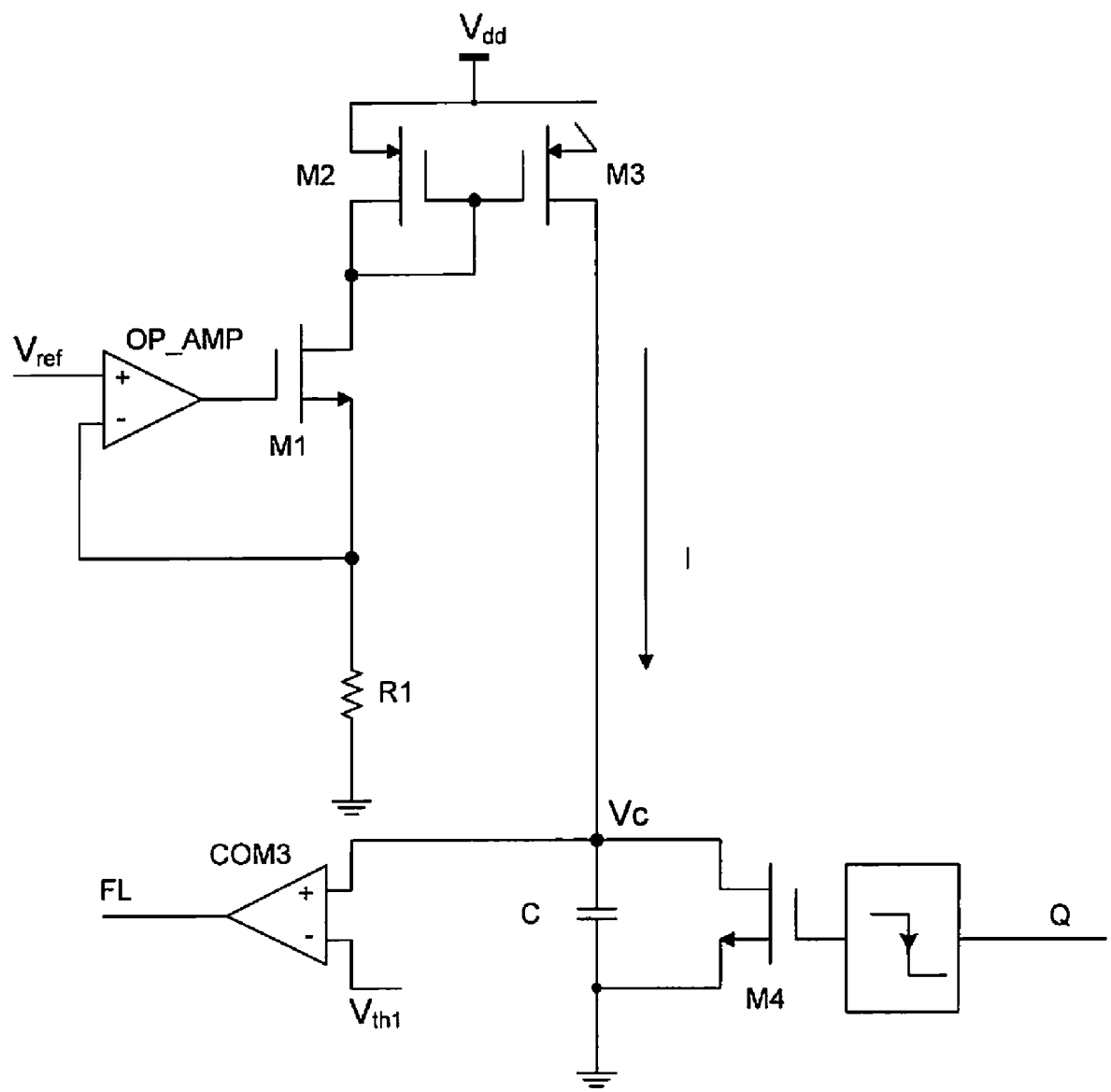
FIG. 5 illustrates the signal generator of the switching regulators shown in FIG. 2 and FIG. 3, wherein the minimum off time is a constant.

FIG. 5 illustrates the signal generator of the switching regulators shown in FIG. 2 and FIG. 3, wherein the minimum off time is a constant $t_{limit1}$. It comprises an operational amplifier OP_AMP, a comparator COM3, switches M1~M4, a resistor R1 and a capacitor C. The non-inverting input terminal of the operational amplifier OP_AMP receives a reference voltage $V_{ref}$, the inverting input terminal is electrically connected to the source of the switch M1 and one terminal of the resistor R1, the output terminal is electrically connected to the gate of the switch M1. The other terminal of the resistor R1 is grounded. The drain of the switch M1 is electrically connected to the drain of the switch M2. The gate of the switches M2 and M3 are electrically connected together and connected to the drain of the switch M2. The source of the switches M2 and M3 both receive a power supply voltage $V_{dd}$. The capacitor C is electrically between the drain of the switch M3 and the ground. The drain of the switch M3 is further electrically connected to the drain of the switch M4 and the non-inverting input terminal of the comparator COM3. The inverting terminal of the comparator COM3 receives a threshold $V_{th1}$. The source of the switch M4 is grounded. The gate of the switch M4 is electrically coupled to the output terminal Q of the flip-flop FF through a one-shot circuit. The output signal of the comparator COM3 is the frequency limitation signal FL. The current flowing through the switch M2 is equal to the current flowing through the resistor R1, which is $$\frac{V_{ref}}{R1}.$$

Since the switch M2 forms a current mirror together with the switch M3, the current flowing through the switch M3 is $$I = n * \frac{V_{ref}}{R1},$$

wherein n is the coefficient of the current mirror. In one embodiment, the signal generator is realized by an integrated circuit, and n is determined by the width-length ratio of the switches M2 and M3.

Figure 6:
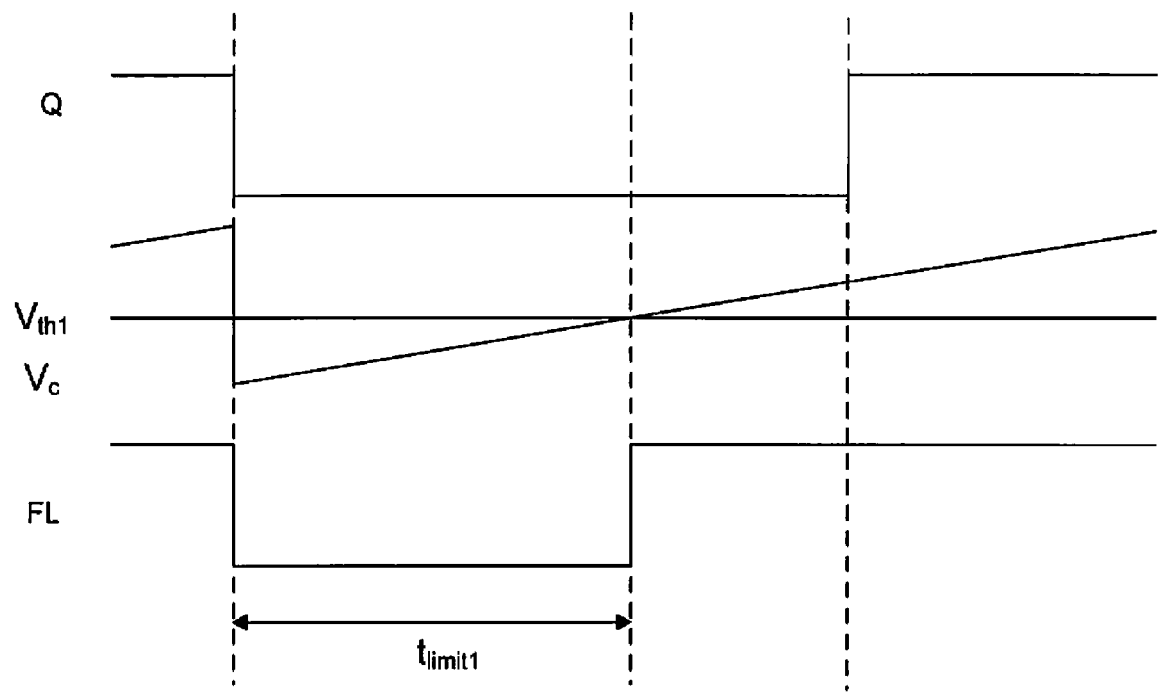
FIG. 6 is the waveform of the signal generator shown in FIG. 6.

FIG. 6 is the waveform of the signal generator shown in FIG. 5. At the falling edge of the output signal Q of the flip-flop FF, the switch M4 is turned on and the capacitor C is quickly discharged. The voltage across the capacitor C is zero, and the frequency limitation signal FL is low (valid). At any other time, the switch M4 is off. The capacitor is charged by the current I and the voltage across it is increased. The frequency limitation signal FL becomes high (invalid) after a time period $t_{limit1}$ when the voltage across the capacitor C is larger than the threshold $V_{th1}$. $t_{limit1}$ is determined by the reference voltage $V_{ref}$, the resistor R1, the coefficient n and the threshold $V_{th1}$.

Figure 7:
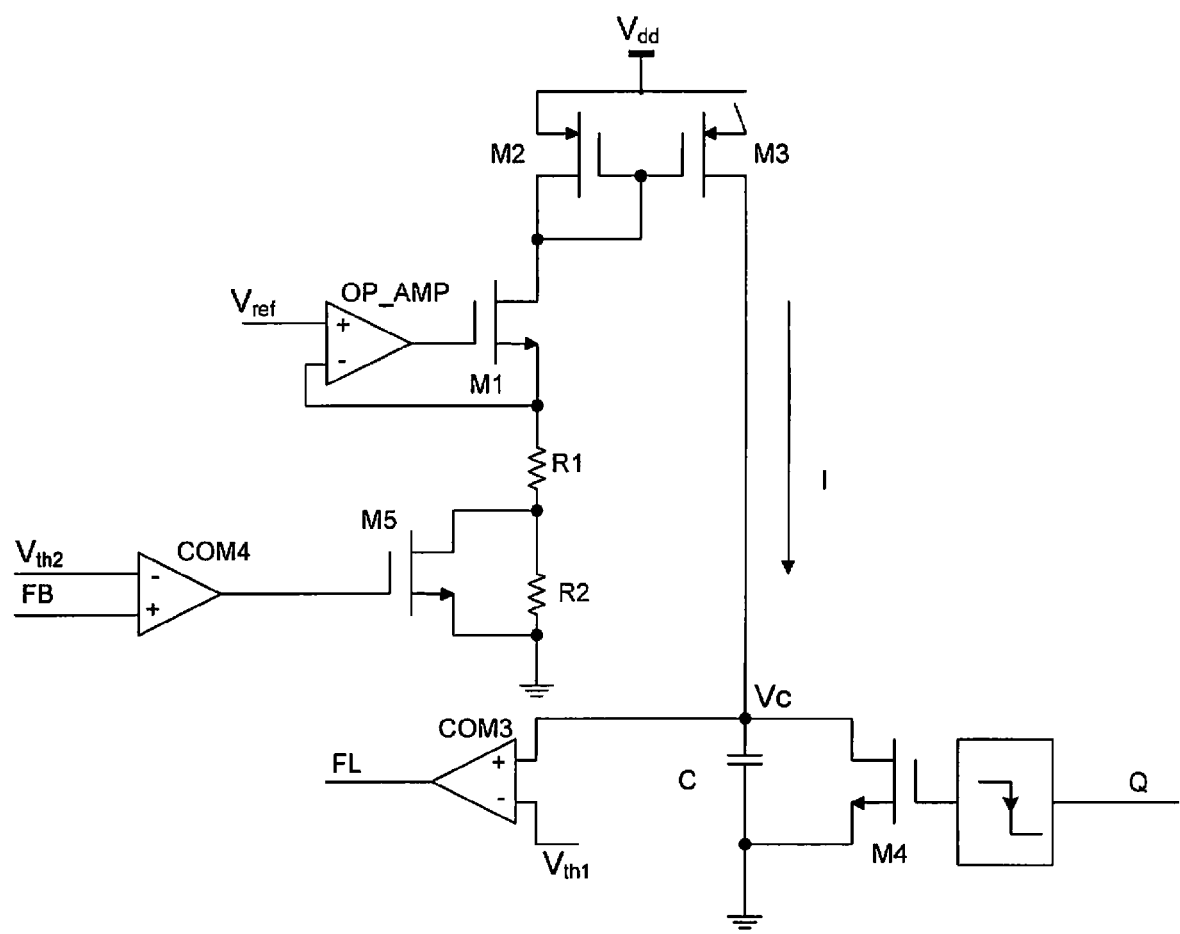
FIG. 7 illustrates the signal generator of the switching regulators shown in FIG. 2 and FIG. 3, wherein the minimum off time is variable with the load.

FIG. 7 illustrates the signal generator of the switching regulators shown in FIG. 2 and FIG. 3, wherein the minimum off time is variable with the load. It further comprises a switch M5, a resistor R2 and a comparator COM4 compared with the circuit shown in FIG. 5. The non-inverting input terminal of the comparator COM4 is electrically connected to the voltage feedback circuit 103 to receive the feedback signal FB, the inverting input terminal receives a threshold $V_{th2}$, the output terminal is electrically coupled to the gate of the switch M5. One terminal of the resistor R1 is electrically connected to the source of the switch M1. The other terminal of the resistor R1 is electrically connected to the drain of the switch M5 and one terminal of the resistor R2. The source of the switch M5 and the other terminal of the resistor R2 are both grounded.

When the feedback signal FB is larger than the threshold $V_{th2}$, the output signal of the comparator COM4 is high and the switch M5 is turned on. The current flowing through the switch M1 is $$\frac{V_{ref}}{R1}.$$

The current flowing through the switch M3 is $$I = n * \frac{V_{ref}}{R1}$$

and the minimum off time is $t_{limit2}$. When the feedback signal FB is smaller than the threshold $V_{th2}$, the output signal of the comparator COM4 is low and the switch M5 is turned off. The current flowing through the switch M1 is $$\frac{V_{ref}}{R1 + R2}.$$

The current flowing through the switch M3 is $$I = n * \frac{V_{ref}}{R1 + R2}$$

and the minimum off time is $t_{limit3}$. The minimum off time may be different value under different load, not limited by the embodiment.

Figure 8:
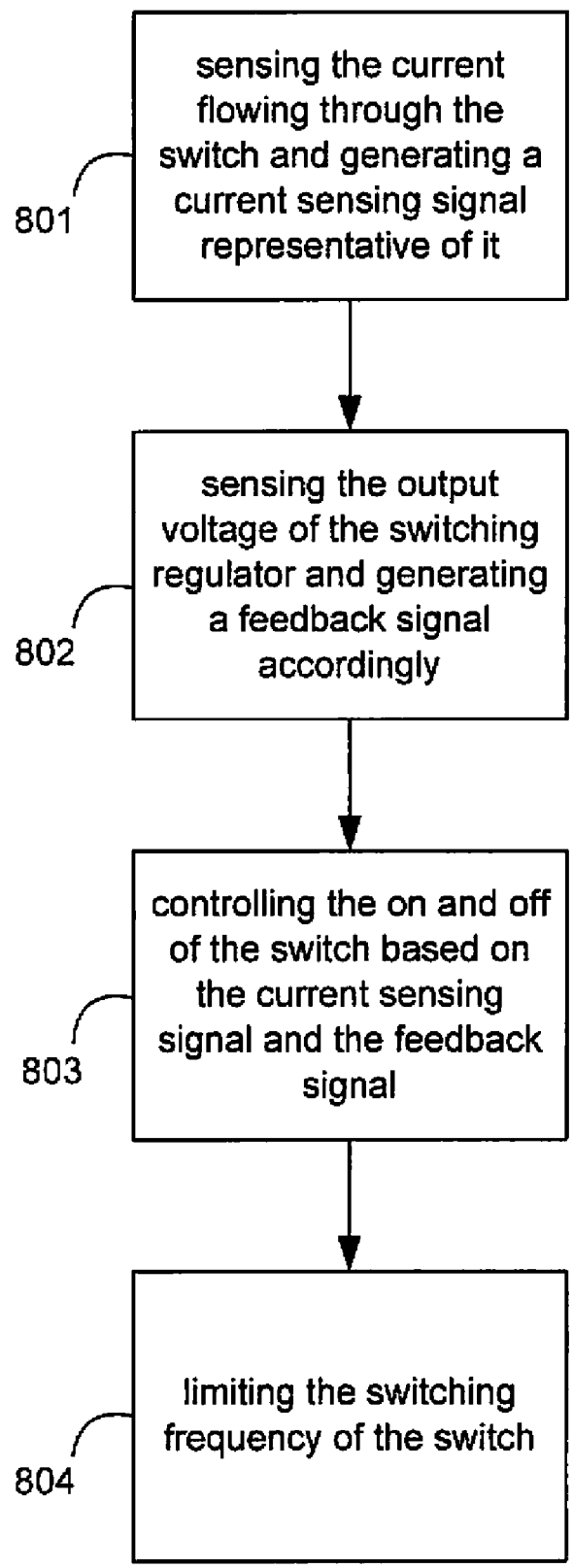
FIG. 8 is the flow chart of a frequency limitation method used in a switching regulator, in accordance with one embodiment of the present disclosure.

FIG. 8 is the flow chart of a frequency limitation method used in a switching regulator, in accordance with one embodiment of the present disclosure. The switching regulator comprises a tank element and a switch, wherein the tank element stores energy when the switch is on and the stored energy is transferred to the load when the switch is off. The method comprises steps 801-804.

At step 801, the current flowing through the switch is sensed and a current sensing signal is generated representative of it.

At step 802, the output voltage of the switching regulator is sensed and a feedback signal is generated accordingly.

At step 803, the on and off of the switch is controlled based on the current sensing signal and the feedback signal. In one embodiment, the current sensing signal is compared with the feedback signal, and the switch is turned off when the current sensing signal is larger than the feedback signal.

At step 804, the switching frequency of the switch is limited.

In one embodiment, the switching frequency is limited through setting a minimum off time. The minimum off time may be constant, or variable with the load.

In one embodiment, the method further comprising sensing the voltage across the switch and generating a switch voltage sensing signal accordingly. The switch voltage sensing signal is compared with a threshold, and the switch is turned on when the switch voltage sensing signal is smaller than the threshold.

Many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiments) thereof has been disclosed.

We claim:

1. A switching regulator with frequency limitation, comprising:
   a switch;
   a current sensing circuit, electrically coupled to said switch, wherein the current sensing circuit senses the current flowing through said switch and generates a current sensing signal;
   a voltage feedback circuit configured to sense the output signal of said switching regulator and generate a feedback signal;
   a control circuit, electrically coupled to said switch to control its on and off state, wherein said control circuit compares said current sensing signal with said feedback signal and turns off said switch based on the comparison result; and
   a frequency limitation circuit, electrically coupled to said control circuit to limit the switching frequency of said switch.

2. The switching regulator of claim 1, wherein said frequency limitation circuit limits the switching frequency through setting a minimum off time.

3. The switching regulator of claim 2, wherein said minimum off time is constant.

4. The switching regulator of claim 2, wherein said minimum off time is variable with the load.

5. The switching regulator of claim 2, further comprises a switch voltage sensing circuit, sensing the voltage across said switch and generating a switch voltage sensing signal accordingly, wherein said control circuit compares said switch voltage sensing signal with a threshold and turns on said switch when said switch voltage sensing signal is smaller than said threshold.

6. The switching regulator of claim 5, wherein said control circuit comprises:
   a first comparison circuit, electrically coupled to said current sensing circuit and said voltage feedback circuit, comparing said current sensing signal with said feedback signal;
   a second comparison circuit, electrically coupled to said switch voltage sensing circuit, comparing said switch voltage sensing signal with said threshold; and
   a logic circuit, electrically coupled to said first comparison circuit and said second comparison circuit, turning off said switch when said current sensing signal is larger than said feedback signal and turning on said switch when said switch voltage sensing signal is smaller than said threshold.

7. The switching regulator of claim 6, wherein said frequency limitation circuit comprises:
   a signal generator, electrically coupled to said logic circuit, generating a frequency limitation signal according to the output signal of said logic circuit; and
   a gate circuit, electrically coupled between said first or second comparison circuit and said logic circuit and electrically coupled to said signal generator, generating a signal into said logic circuit based on said frequency limitation signal and the output signal of said first or second comparison circuit;

wherein said switch is maintained off when said frequency limitation signal is valid.

8. The switching regulator of claim 7, wherein said minimum off time is constant.

9. The switching regulator of claim 8, wherein said signal generator comprises:

an operational amplifier, the non-inverting input terminal of said operational amplifier receives a reference voltage;

a resistor, electrically connected between the inverting input terminal of said operational amplifier and the ground;

a first switch, the gate of said first switch is electrically connected to the output terminal of said operational amplifier, the source of said first switch is electrically connected to the non-inverting input terminal of said operational amplifier;

a current mirror comprising a second switch and a third switch, the source of said second and third switch both receive a power supply voltage, the gate of said second and third switch are electrically connected together and connected to the drain of said first and second switch;

a fourth switch, the gate of said fourth switch is electrically coupled to the output terminal of said logic circuit through a one-shot circuit, the drain of said fourth switch is electrically connected to the drain of said third switch, the source of said fourth switch is grounded;

a capacitor, electrically connected between the drain and source of said fourth switch; and a comparator, the non-inverting input terminal of said comparator is electrically connected to the drain of said fourth switch, the inverting input terminal of said comparator receives a first threshold, the output terminal of said comparator outputs said frequency limitation signal.

10. The switching regulator of claim 7, wherein said signal generator is further electrically connected to said voltage feedback circuit to adjust said minimum off time based on said feedback signal.

11. The switching regulator of claim 10, wherein said signal generator comprises:

an operational amplifier, the non-inverting input terminal of said operational amplifier receives a reference voltage;

a first switch, the gate of said first switch is electrically connected to the output terminal of said operational amplifier, the source of said first switch is electrically connected to the non-inverting input terminal of said operational amplifier;

a current mirror comprising a second switch and a third switch, the source of said second and third switch both receive a power supply voltage, the gate of said second and third switch are electrically connected together and connected to the drain of said first and second switch;

a fourth switch, the gate of said fourth switch is electrically coupled to the output terminal of said logic circuit through a one-shot circuit, the drain of said fourth switch is electrically connected to the drain of said third switch, the source of said fourth switch is grounded;

a capacitor, electrically connected between the drain and source of said fourth switch;

a first comparator, the non-inverting input terminal of said first comparator is electrically connected to the drain of said fourth switch, the inverting input terminal of said first comparator receives a first threshold, the output terminal of said first comparator outputs said frequency limitation signal;

a second comparator, the non-inverting input terminal of said second comparator is electrically connected to said voltage feedback circuit to receive said feedback signal, the inverting input terminal of said second comparator receives a second threshold;

a fifth switch, the gate of said fifth switch is electrically coupled to the output terminal of said second comparator, the source of said fifth switch is grounded;

a first resistor, electrically connected between the inverting input terminal of said operational amplifier and the drain of said fifth switch;

a second resistor, electrically connected between the drain and source of said fifth switch.

12. A frequency limitation method used in a switching regulator, comprising:

sensing the current flowing through a switch and generating a current sensing signal representative of the current flowing;

sensing the output voltage of the switching regulator and generating a feedback signal;

comparing said current sensing signal with said feedback signal;

turning off said switch based on the comparison result; and limiting the switching frequency of said switch.

13. The method of claim 12, wherein the switching frequency is limited through setting a minimum off time.

14. The method of claim 13, wherein said minimum off time is constant.

15. The method of claim 13, wherein said minimum off time is variable with the load.

16. The method of claim 13, further comprising:

sensing the voltage across said switch and generating a switch voltage sensing signal accordingly;

comparing said switch voltage sensing signal with a threshold, and turning on said switch when said switch voltage sensing signal is smaller than said threshold.

* * * * *